United States Patent
Takubo

(10) Patent No.: US 7,726,915 B2
(45) Date of Patent: Jun. 1, 2010

(54) MACHINE FOR SPECTACLE LENS

(75) Inventor: Sadao Takubo, Takehara (JP)

(73) Assignee: Takubo Machines Works Co., Ltd., Hiroshima-ken (JP)

( * ) Notice: Subject to any disclaimer, the term of this patent is extended or adjusted under 35 U.S.C. 154(b) by 489 days.

(21) Appl. No.: 11/901,854

(22) Filed: Sep. 19, 2007

(65) Prior Publication Data
US 2008/0083104 A1    Apr. 10, 2008

(30) Foreign Application Priority Data

Oct. 10, 2006    (JP)    ............................. 2006-276124

(51) Int. Cl.
B23B 47/00    (2006.01)
B23G 1/00     (2006.01)
B21D 33/00    (2006.01)
(52) U.S. Cl. .............................. 408/90; 408/103; 29/20
(58) Field of Classification Search .................. 29/20; 269/61; 408/89, 90, 91, 103, 1 R
See application file for complete search history.

(56) References Cited

U.S. PATENT DOCUMENTS 5,722,647 A * 3/1998 Rattaro et al. ................. 269/45

2007/0173182 A1 * 7/2007 Curcher ....................... 451/42
2009/0191014 A1 * 7/2009 Dupuy et al. ............... 408/1 R

FOREIGN PATENT DOCUMENTS

| DE | 202004009086 U1 | * | 10/2004 |
| JP | 2002-328345 | | 11/2002 |
| JP | 2003-145328 | | 5/2003 |
| JP | 2005-092036 | | 4/2005 |

* cited by examiner

Primary Examiner—David P Bryant
Assistant Examiner—Jacob J Cigna
(74) Attorney, Agent, or Firm—Nields, Lemack & Frame, LLC

(57) ABSTRACT

A machine for spectacle lens, comprising a lens holding unit for holding left and right spectacle lenses, and a drill drive unit relatively moving in left and right directions and in front and rear directions with respect to the lens holding unit and for forming a hole on the spectacle lens held on the lens holding unit, wherein the lens holding unit has lens supporting base plates separated at left and right to match the left and the right spectacle lenses, the spectacle lenses at left and right are supported by the lens holding unit via the lens supporting base plates, and the left and right lens supporting base plates can be rotated around positions symmetrical with respect to the front-to-rear direction.

4 Claims, 5 Drawing Sheets

MACHINE FOR SPECTACLE LENS

BACKGROUND OF THE INVENTION

The present invention relates to a machine for spectacle lens for forming a hole to mount a frame on a spectacle lens when a rimless spectacle frame is mounted on the spectacle lens.

A rimless spectacle frame, i.e. a so-called two-point frame is used as a spectacle lens frame from the viewpoints of design and lightweight structure.

As shown in FIG. 5, a two-point frame 1 is designed in such a manner that left and right spectacle lenses 2 and 2 are directly connected by a bridge 3, and one end of a temple 4 is directly fixed on the spectacle lens 2. The fixing of the bridge 3 on the spectacle lens 2 and the fixing of the temple 4 on the spectacle lens 2 are executed via a screw 5 or a pin, which penetrates the spectacle lens 2.

Therefore, for the purpose of attaching the two-point frame 1, a hole where the screw or the pin is penetrating is formed on the spectacle lens 2.

FIG. 6 is a perspective view of a conventional type machine 7 for spectacle lens for forming a hole on the spectacle lens 2.

The machine 7 for spectacle lens comprises a lens holding table 9 and a drill supporting unit 11 mounted on a base 8.

The lens holding table 9 has a Y-axis table 12 to move in a direction (Y-axis direction) to come closer to or to be separated away from the drill supporting unit 11, and an X-axis table 13 to move in a direction (X-axis direction) perpendicularly crossing the Y-axis. When a Y-axis handle 14 is rotated in a normal or reverse direction, the Y-axis table 12 comes closer to or is separated away from the drill supporting unit 11. When an X-axis handle 15 is rotated in a normal or reverse direction, the X-axis table 13 is moved to the left or to the right.

On an upper surface of the X-axis table 13, a lens holding unit 16 is provided.

The lens holding unit 16 comprises a reference plane 17 and a stopper-roller 18, which is disposed at a certain distance from the reference plane 17. The spectacle lens 2 is pressed to the reference plane 17 and the spectacle lens 2 is also pressed to the stopper-roller 18. As a result, positioning of the spectacle lens 2 is performed and its posture is determined.

It is so designed that the spectacle lens 2 is fixed on the X-axis table 13 by a T-shaped spectacle presser 19. The spectacle presser 19 is removably fixed by screws. In the figure, reference numeral 20 denotes a reference line marked on the spectacle lens 2.

The drill supporting unit 11 is provided with a slide guide unit 21, which can be tilted in left and right directions around its lower end. A slider 22 is mounted on the slide guide unit 21 so that the slider 22 can be moved in a vertical direction (Z-axis direction). The slider 22 can be moved in a vertical direction by operating a Z-axis handle 23.

A drill 24 for drilling a hole is attached on the slider 22, and the drill 24 is rotated by an electric motor (not shown).

Now, description will be given on a case where holes are drilled on the spectacle lens 2 in the conventional type machine 7 for spectacle lens.

First, the spectacle lens 2 is set on the lens holding unit 16. Then, the spectacle lens 2 is moved to a machining position and a hole is drilled.

Under the condition that the spectacle presser 19 is taken off, the left and the right spectacle lenses 2 to be machined are placed on the lens holding unit 16, and positioning and posture alignment are performed on each of the spectacle lenses 2.

To perform the positioning and the posture alignment, an upper edge of the spectacle lens 2 is pressed to the reference plane 17, and the spectacle lens 2 is further pressed to the stopper-roller 18. For the tilting of the spectacle lens 2, the reference line 20 is utilized. When the positioning and the posture alignment have been completed, the spectacle presser 19 is mounted, and the spectacle lens 2 is fixed on the lens holding unit 16.

When the upper surface of the spectacle lens 2 is curved, the slide guide unit 21 is tilted and adjustment is made so that the drill 24 is directed perpendicularly to the surface of the spectacle lens 2. The Y-axis handle 14 and the X-axis handle 15 are rotated, and the Y-axis table 12 and the X-axis table 13 are moved to the hole drilling position. While the drill 24 is being rotated, the drill 24 is moved down by operating the Z-axis handle 23, and a hole is drilled on the spectacle lens 2.

Depending on the type of the spectacle frame, the spectacle lens 2 must be mounted by tilting the spectacle lens 2 because of its design. For instance, under the condition that spectacles are put on, each of the spectacle lenses may be tilted upward from the center to the edge. When such type of spectacle frame is used, the spectacle lenses 2 must be tilted to be symmetrical to left and right when the positioning of the spectacle lens 2 is performed on the lens holding unit 16.

In the conventional machine 7 for spectacle lens as described above, the machine has positioning function in Y-axis and X-axis directions of the spectacle lens 2 but has no positioning function for tilting. Therefore, an operator must tilt the spectacle lens 2 manually. However, how far the spectacle lens 2 should be tilted depends on the sense and the skill of the operator. The accuracy in finishing depends on the skill of the operator. In some cases, the balance between left and right may be lost.

SUMMARY OF THE INVENTION

It is an object of the present invention to provide a machine for spectacle lens, by which it is possible to perform the setting of a spectacle lens in easy and simple manner, and to set the tilting accurately without impairing left-to-right symmetry even when spectacle lenses are machined by tilting them.

To attain the above object, the present invention provides a machine for spectacle lens, which comprises a lens holding unit for holding left and right spectacle lenses, and a drill drive unit relatively moving in left and right directions and in front and rear directions with respect to the lens holding unit and for forming a hole on the spectacle lens held on the lens holding unit, wherein the lens holding unit has lens supporting base plates separated at left and right to match the left and the right spectacle lenses, the spectacle lenses at left and right are supported by the lens holding unit via the lens supporting base plates, and the left and right lens supporting base plates can be rotated around positions symmetrical with respect to the front-to-rear direction.

Also, the present invention provides the machine for spectacle lens as described above, wherein the left and right lens supporting base plates are connected with each other via a gear unit and can be rotated symmetrically to left and right. Further, the present invention provides the machine for spectacle lens as described above, wherein first positioning pins are erected at positions symmetrical with respect to the front-to-rear direction respectively on the left and the right lens supporting base plates, a horizontal reference plate is provided to stretch between the first positioning pins at left and right, the horizontal reference plate has a reference line extending in the left-to-right direction, and the reference line can be visually confirmed through the spectacle lens. Also, the present invention provides the machine for spectacle lens as described above, wherein a rotation index is provided to indicate a rotation angle of the lens supporting base plate. Further, the present invention provides the machine for spectacle lens as described above, wherein each of the lens supporting base plates comprises a second positioning pin erected so as to be positioned on the outside of the first positioning pin, a lens fixing arm so as to be capable of moving closer to and apart from the second positioning pin, a movable pin mounted on the tip of the lens fixing arm, and clamp flanges formed at the same heights on upper ends of the first positioning pin, the second positioning pin and the movable pin, wherein the spectacle lens is held by pressing the clamp flange of the movable pin to the spectacle lens under the condition that the spectacle lens is abutted to the clamp flange of the second positioning pin.

According to the present invention, there are provided a lens holding unit for holding left and right spectacle lenses, and a drill drive unit relatively moving in left and right directions and in front and rear directions with respect to the lens holding unit and for forming a hole on the spectacle lens held on the lens holding unit, and the lens holding unit has lens supporting base plates separated at left and right to match the left and the right spectacle lenses, the spectacle lenses at left and right are supported by the lens holding unit via the lens supporting base plates, and the left and right lens supporting base plates can be rotated around positions symmetrical with respect to the front-to-rear direction. As a result, the spectacle lens can be tilted while the spectacle lens is set on the lens supporting base plate. Because the left and the right lens supporting base plates are rotated in symmetrical relation, tilt angles of left and right lenses can be easily set.

Also, according to the present invention, the left and right lens supporting base plates are connected with each other via a gear unit and can be rotated symmetrically to left and right. When one of the lens supporting base plates is rotated, the other is rotated symmetrically, and the tilting of the left and the right spectacle lenses can be set without variation or unbalancing.

Further, according to the present invention, first positioning pins are erected at positions symmetrical with respect to the front-to-rear direction respectively on the left and the right lens supporting base plates, a horizontal reference plate is provided to stretch between the first positioning pins at left and right, the horizontal reference plate has a reference line extending in the left-to-right direction, and the reference line can be visually confirmed through the spectacle lens. By aligning the reference line of the spectacle lens with the reference line of the horizontal reference plate, the positioning of the spectacle lens with respect to the lens supporting base plate can be performed in easier manner.

Also, according to the present invention, a rotation index is provided to indicate a rotation angle of the lens supporting base plate. As a result, the setting of the tilt angle of the spectacle lens can be performed in easier manner.

Further, according to the present invention, each of the lens supporting base plates comprises a second positioning pin erected so as to be positioned on the outside of the first positioning pin, a lens fixing arm so as to be capable of moving closer to and apart from the second positioning pin, a movable pin mounted on the tip of the lens fixing arm, and clamp flanges formed at the same heights on upper ends of the first positioning pin, the second positioning pin and the movable pin, wherein the spectacle lens is held by pressing the clamp flange of the movable pin to the spectacle lens under the condition that the spectacle lens is abutted to the clamp flange of the second positioning pin. The two positioning pins serve as reference points no matter whatever shape the spectacle lens may have. The spectacle lens is held at three points and is held in stable manner no matter whatever shape the spectacle lens may have.

DETAILED DESCRIPTION OF THE PREFERRED EMBODIMENT

Description will be given below on the best mode for carrying out the present invention by referring to the attached drawings.

Figure 1:
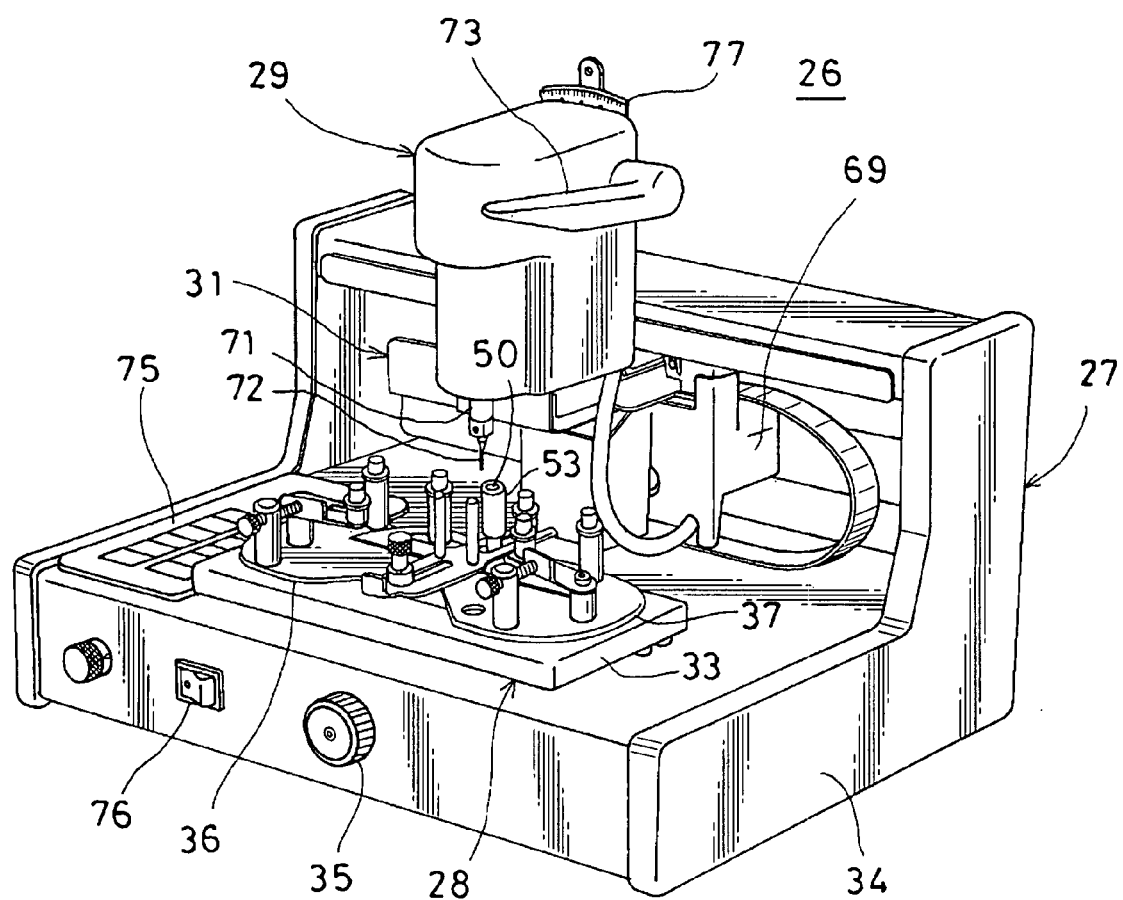
FIG. 1 is a perspective view of an embodiment of the present invention.

FIG. 1 shows a machine 26 for spectacle lens according to the present invention. In FIG. 1, a left-to-right direction facing toward the machine 26 for spectacle lens is referred as X-axis direction. A front-to-rear direction is referred as Y-axis direction, and an up-to-bottom direction is referred as Z-axis direction.

Figure 6:
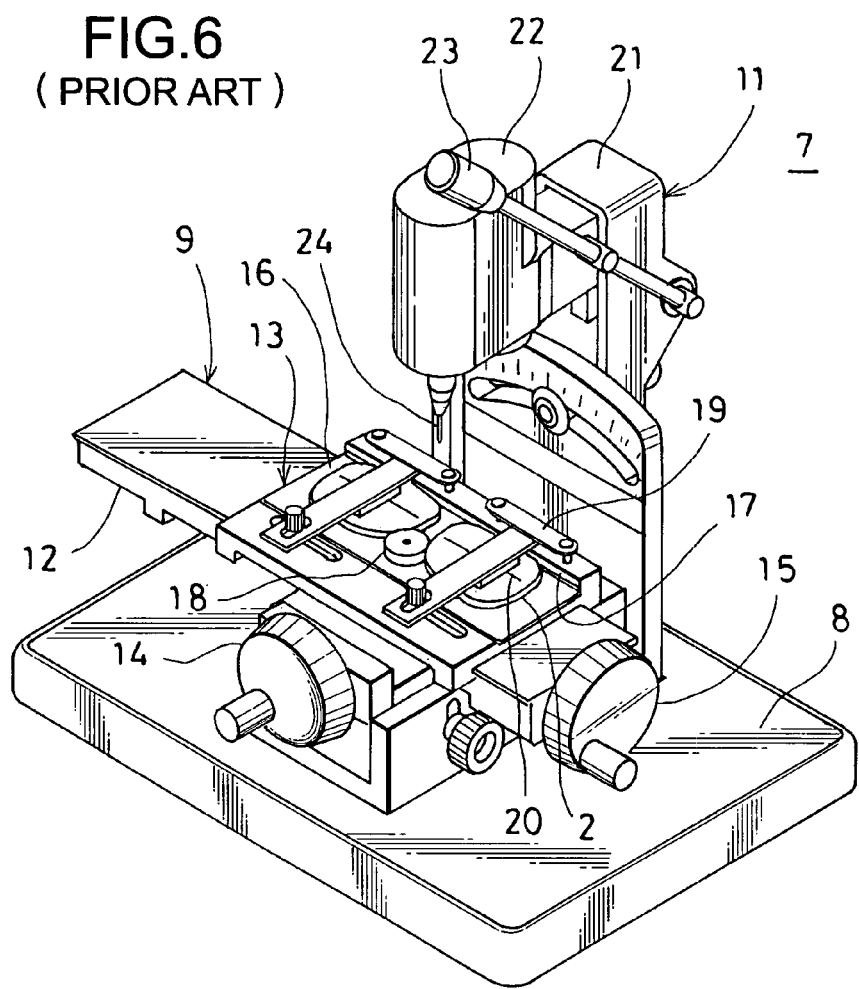
FIG. 6 is a perspective view of a conventional type machine for spectacle lens.

The machine 26 for spectacle lens primarily comprises a machine main unit 27 for accommodating a power source unit, a control unit, etc., a lens holding unit 28 where spectacle lenses 2 (see FIG. 6) are set, a drill drive unit 29 for accommodating an electric motor or the like and for rotating and driving a drill 72, a drill supporting unit 31 for movably supporting the drill drive unit 29 in three directions: X-axis, Y-axis and Z-axis directions.

First, referring to FIG. 2 and FIG. 3, description will be given on the lens holding unit 28.

A base unit 33 is mounted on a housing 34 so as to be tiltable around a horizontal axis 32 extending in a left-to-right direction. By rotating a tilt adjusting knob 35, the tilt angle of the base unit 33 can be adjusted.

A pair of left and right lens supporting base plates 36 and 37 are mounted rotatably around rotation shafts 38 and 39 on the base unit 33. The rotation shafts 38 and 39 are disposed at positions symmetrical with respect to the Y-axis.

An angle finding hole 41 is formed on the lens supporting base plate 37. Except that the angle finding hole 41 is formed on the lens supporting base plate 37, the lens supporting base plates 36 and 37 are designed in symmetrical shape to left and right (symmetrical with respect to the Y-axis). In the following, description will be given on the lens supporting base plate 37.

Positioning pins 42 and 43, each indicating a horizontal position, are erected respectively along the upper side of the lens supporting base plate 37, and a clamp flange 44 is provided on an upper end of each of the positioning pins 42 and 43. The clamp flange 44 is made of synthetic resin, and has a flange formed on a lower portion, and its cross-section is in convex form.

A screw supporting pin 45 and an arm supporting pin 46 are erected on the lens supporting base plate 37 so that the screw supporting pin 45 and the arm supporting pin 46 are at positions to face respectively to the positioning pins 42 and 43. On an upper end of the arm supporting pin 46, a lens fixing arm 47 is mounted so that the lens fixing arm 47 can be rotated in a horizontal direction. A part of the lens fixing arm 47 is bent upward and serves as a screw receptacle 48.

At a tip of the lens fixing arm 47, a movable pin 49 is erected. An upper end of the movable pin 49 has the same height as the upper ends of the positioning pins 42 and 43, and a clamp flange 51 is provided on the upper end. The clamp flange 51 is made of synthetic resin and is designed in the same shape as that of the clamp flange 44 and is positioned at the same height.

A lens fixing screw 52 is screwed through the screw fixing pin 45. The tip of the lens fixing screw 52 is abutted to the screw receptacle 48. By rotating the fixing screw 52, the tip is displaced in a front-to-rear direction. As a result, the screw receptacle 48 is pushed by the tip, and the lens fixing arm 47 is rotated.

A reference pin 53 is erected on the base unit 33 at the middle on the way between the positioning pin 42 on the lens supporting base plate 36 and the positioning pin 42 on the lens fixing arm 47. A lock nut seat 54 is arranged between the arm supporting pin 46 on the lens supporting base plate 36 and the arm supporting pin 46 on the lens supporting base plate 37. A line, which passes through the center of the lock nut seat 54 and the center of the reference pin 53, perpendicularly crosses the X-axis. On the upper end of the reference pin 53, an origin setting hole 50 is formed.

A horizontal reference plate 55 in convex planar shape is provided to stretch between the positioning pin 42 at the left and the positioning pin 42 at the right. On the horizontal reference plate 55, two elongated holes 56 and 56 are formed in parallel to the X-axis, and an elongated hole 57 having a longer axis perpendicularly crossing the longer axes of the elongated holes 56 is formed between the elongated holes 56 and 56.

The positioning pins 42 are slidably engaged in the elongated holes 56 respectively. The reference pin 53 is slidably engaged in the elongated hole 57. One side of the horizontal reference plate 56 forms a reference line 58, and the reference line 58 runs in parallel to the X-axis. It may be so designed that the reference line 58 is engraved or printed or the like on the upper surface of the horizontal reference plate 55.

A left-right position setting plate 59 is provided to stretch over the reference pin 53 and the lock nut seat 54. One end of the left-right position setting plate 59 is designed in form of a two-branched fork with a slit 61 formed in-between, and the slit 61 is designed in form of an elongated hole with its one end open. On the other end of the left-right position setting plate 59, an elongated hole 62 is formed. The longer axis of the elongated hole 62 and the longer axis of the slit 61 run on the same line, and the slit 61 and the elongated hole 62 perpendicularly cross the X-axis. The other end of the left-right position setting plate 59 is bent upward, and a tab 60 is formed. On the left-right position setting plate 59, position setting pins 64 and 64 are erected at left and right positions symmetrical to each other.

The slit 61 is slidably engaged with the reference pin 53, and the elongated hole 62 is slidably engaged with the lock nut seat 54. A lock bolt 65 is screwed and erected on the lock nut seat 54. By screwing and fastening the lock bolt 65, the left-right position setting plate 59 can be fixed on the base unit 33.

As described above, the lens supporting base plate 36 can be rotated around the rotation shaft 38 as the rotation center, and the lens supporting base plate 37 can be rotated around the rotation shaft 39 as the rotation center. On the lens supporting base plates 36 and 37, gear teeth 66 and 66 are formed respectively. The lens supporting base plate 36 and the lens supporting base plate 37 are coupled together via the gear teeth 66 and 66, and the lens supporting base plate 36 and the lens supporting base plate 37 are rotated symmetrically to each other.

On a portion of the base unit 33 corresponding to the angle finding hole 41, an angle index 67 is marked so that angles of the lens supporting base plates 36 and 37 can be read on the angle index 67.

Figure 2:
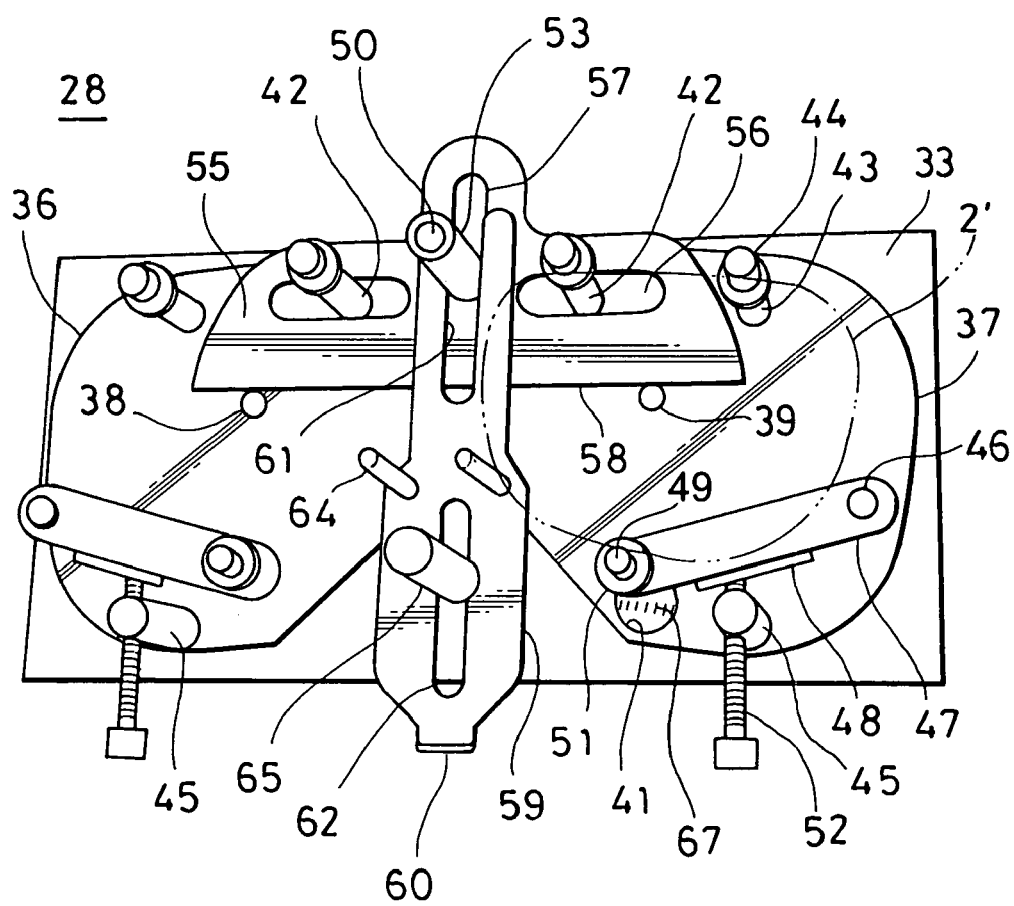
FIG. 2 is a perspective plan view of a lens holding unit in the embodiment of the present invention.
Figure 3:
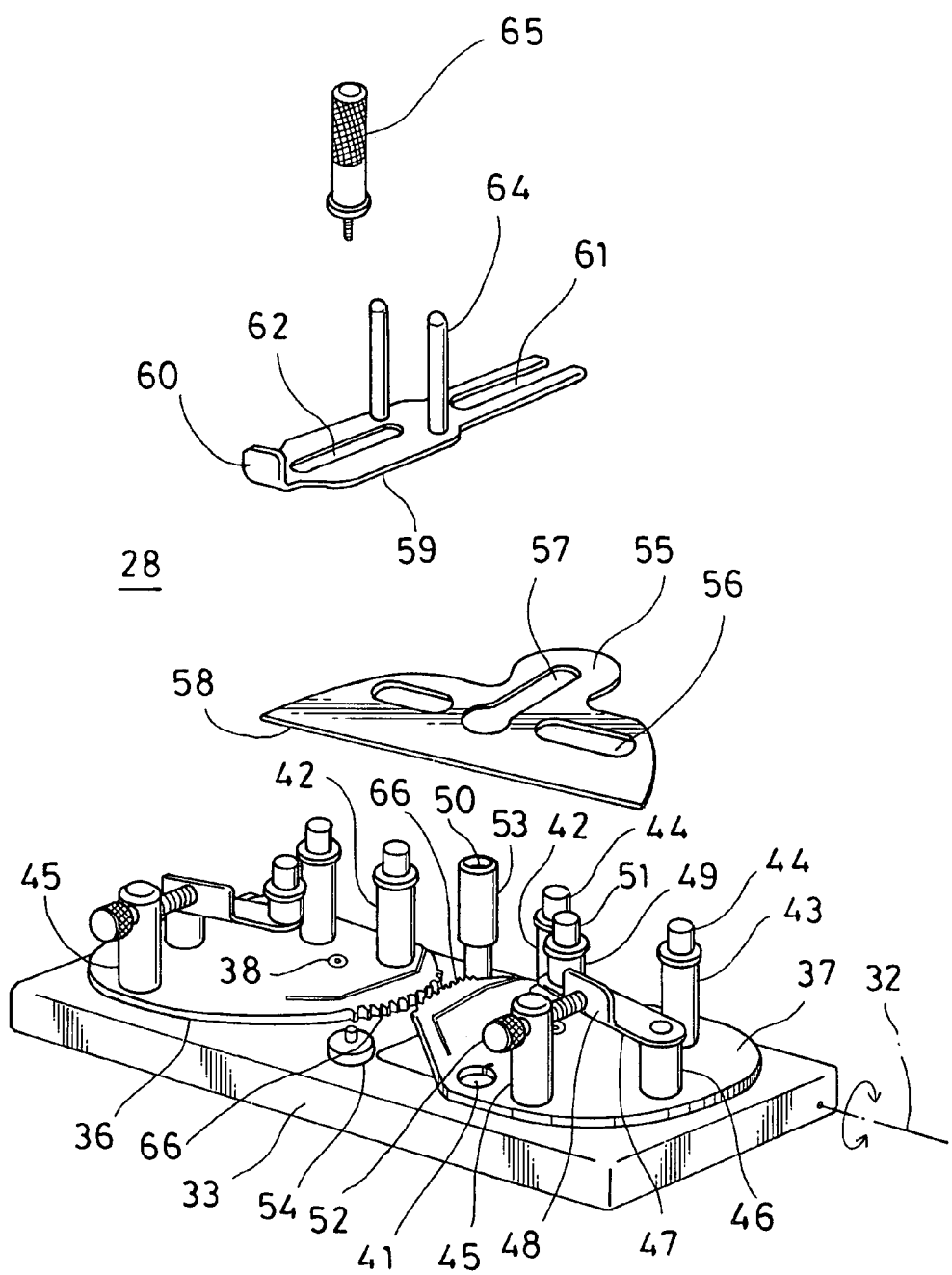
FIG. 3 is an exploded perspective view of the lens holding unit in the embodiment of the invention.

As shown in FIG. 2, positioning of the spectacle lens 2 is performed in such a manner that the upper edge of the spectacle lens 2 is abutted to the positioning pins 42 and 43, and the inner edge is abutted to the positioning pin 64. By screwing and fastening the lens fixing screw 52, the clamp flange 51 is abutted to the lower edge of the spectacle lens 2. The spectacle lens 2 is clamped and supported by the clamp flanges 44 and 44 and by the clamp flange 51. The position of the spectacle lens 2 in height direction is determined by the positions of the flanges of the clamp flanges 44, 44 and 51.

The drill drive unit 29 is connected to the drill supporting unit 31 via a slider unit 69. The slider unit 69 is slidable in an X-axis direction. The drill drive unit 29 is slidable in a Y-axis direction with respect to the slider unit 69, and the drill drive unit 29 is tiltable in left and right directions.

The drill drive unit 29 has a drill rotation shaft 71, and the drill 72 is removably mounted on the lower end of the drill rotation shaft 71. The drill rotation shaft 71 is connected to an electric motor (not shown) and rotated by the electric motor. The drill rotation shaft 71 is supported by the drill drive unit 29 so that the drill rotation shaft 71 can be moved in an up-to-bottom direction and can be moved up or down by operating a lift handle 73.

In the figure, reference numeral 75 denotes an operation panel, 76 represents a power switch, and 77 represents an angle index 77 to indicate tilting of the drill drive unit 29.

Figure 4:
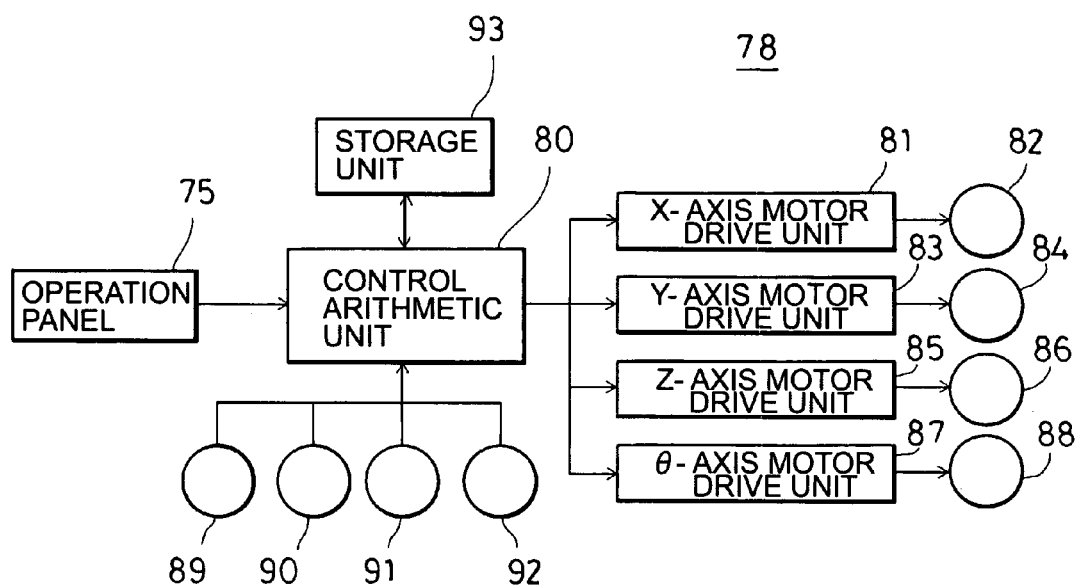
FIG. 4 is a block diagram of a control device in the embodiment of the invention.
Figure 5:
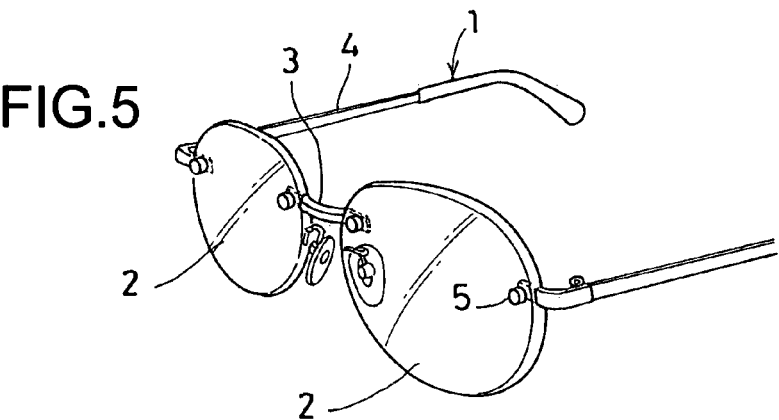
FIG. 5 is a perspective view of spectacles with a two-point frame.

Now, referring to FIG. 4, description will be given on general features of a control device 78.

A control arithmetic unit 80 drives an X-axis motor 82 via an X-axis motor drive unit 81, drives a Y-axis motor 84 via a Y-axis motor drive unit 83, drives and controls a Z-axis motor 86 via a Z-axis motor drive unit 85, and drives a θ-axis motor 88 via a θ-axis motor drive unit 87. Also, the rotation amount and the rotation angle of the X-axis motor 82 are detected by an X-axis encoder 89, and the rotation amount and the rotation angle of the Y-axis motor 84 are detected by an Y-axis encoder 90. The rotation amount and the rotation angle of the Z-axis motor 86 are detected by a Z-axis encoder 91, and the rotation amount and the rotation angle of the θ-axis motor 88 detected by a θ-axis encoder 92.

A storage unit 93 is electrically connected to the control arithmetic unit 80. A sequence program to carry out the drilling is stored in the storage unit 93, and data during teaching operation and various types of data in the course of drilling are stored.

Description will be given below on operation.

The lens supporting base plates 36 and 37 are simultaneously rotated by confirming on the angle index 67 so that the positioning pins 42 and 43 are at the reference positions (parallel to the X-axis). The lens supporting base plates 36 and 37 are coupled with each other via the gear teeth 66 and 66. Thus, when one of the lens supporting base plate 36 and 37 is rotated, the lens supporting base plates 36 and 37 are rotated symmetrically to each other.

The left and right lens supporting base plates 36 and 37 each comprise gear teeth 66 and said gear teeth 66 are intermeshed such that when said left and right lens supporting base plates 36 and 37 are rotated clockwise or counterclockwise, the other of said left and right lens supporting base plates 36 and 37 rotates symmetrically in an opposite direction.

Under the condition that the positioning pins 42 and 43 are at the reference positions, demonstration lenses are set to the lens supporting base plates 36 and 37 respectively. On each of the demonstration lenses, a mounting hole to mount the spectacle frame is already formed. By using the demonstration lenses, teaching is given on the drilling holes.

Left and right demonstration lenses 2' are set on the lens holding unit 28. The setting to the lens holding unit 28 is performed as described below:

The lens fixing screw 52 is moved backward, and the clamp flange 51 is separated from the positioning pins 42 and 43. The lock bolt 65 is loosened, and the left-right position setting plate 59 is moved to such position as to suit the shape of the spectacle lens 2 to be machined. Then, the lock bolt 65 is fastened and the left-right position setting plate 59 is fixed.

The demonstration lens 2' is pressed against the positioning pins 42 and 43 respectively, and the clamp flange 51 is pushed to the demonstration lens 2' by hand so that the demonstration lens 2' is pressed against the positioning pin 64, and the demonstration lens 2' is held almost perfectly. The reference line 58 can be visually confirmed through the demonstration lenses 2'. The reference line marked on each of the demonstration lenses 2' is aligned with the reference line 58.

Under the condition that the reference line on each of the demonstration lenses 2' is aligned with the reference line 58, the lens fixing screws 52 are fastened, and the demonstration lenses 2' are completely fixed. After the fixing, the lock bolt 65 is loosened, and the left-right position setting plate 59 is moved backward. By moving the left-right position setting plate 59 backward, it is possible to avoid that the positioning pin 64 causes a hindrance to the machining of the lens.

In the case the spectacle lenses 2 are mounted on the spectacle frame in horizontal position, teaching operation is performed under the condition that the reference lines of the demonstration lenses 2' are aligned with the reference line 58.

In the case the spectacle lenses 2 are mounted on the spectacle frame in tilted state, either one of the lens supporting base plates 36 or 37 is rotated in order that the demonstration lenses 2' are tilted. When one of the lens supporting base plates 36 and 37 is rotated, the other is rotated symmetrically. The tilt angle is determined depending on the spectacle frame. Whether the lens supporting base plates 36 and 37 are rotated at a predetermined angle or not is confirmed on the angle index 67.

The horizontal reference plate 55 is moved in parallel displacement in a front-to-rear direction (Y-axis direction). Even when the lens supporting base plates 36 and 37 are rotated, the reference line 58 is not tilted. Therefore, even when the upper edge of the spectacle lens 2 and the reference line of the spectacle lens 2 are tilted, the reference line of the spectacle lens 2 can be aligned with the reference line 58, i.e. the reference line of the spectacle lens 2 can be aligned in parallel to the X-axis.

When the setting of tilt angles of the demonstration lenses 2' has been completed, the power of the machine 26 for spectacle lens is turned on.

The drill drive unit 29 is moved manually, and the lift handle 73 is operated to insert the drill 72 into the origin setting hole 50, and, while inserting, a memory button on the operation panel 75 is pressed. The position (X-Y coordinate position) of the drill 72 is stored as the origin in the storage unit 93.

Next, the drill 72 is withdrawn from the origin setting hole 50, and the drill drive unit 29 is tilted in line with the curve of the front surface of the demonstration lens 2' so that the drill 72 will be positioned at right angle to the lens surface. The drill 72 is inserted into a drilling hole of the demonstration lens 2'. The memory button is pressed, and the tilt angle and the coordinate position of the drilling hole is stored in the storage unit 93.

The drill 72 is withdrawn from the drilling hole, and the movement of the drill drive unit 29 in a Y-axis direction is constrained at the same time. As the constraining means, various types of means such as fixing by electromagnetic force, fixing by a lock bolt, etc. can be adopted.

After constraining the movement in a Y-axis direction, the drill drive unit 29 is moved in an X-axis direction and the drill 72 is abutted to the peripheral edge (cut end) of the demonstration lens 2'. A distance in an X-axis direction between the drilling hole and the edge is a value obtained by subtracting the drill radius from the moving distance of the drill drive unit 29 in an X-axis direction. When the memory button is pressed, the distance in an X-axis direction between the drilling hole and the edge is stored in the storage unit 93.

The insertion of the drill 72, the abutment to the edge, and the pressing of the memory button are repeatedly performed on all of the drilling holes on the demonstration lenses 2'. The tilt angle, the coordinate position and the distance in an X-axis direction between the drilling hole and the edge on all of the drilling holes are stored in the storage unit 93.

In the case the surface of the demonstration lens 2' is curved and the drill 72 must be tilted, the drill drive unit 29 is tilted, and the tilt angle of the drill drive unit 29 is stored in the storage unit 93 by pressing the memory button.

When the teaching on the drilling holes has been completed, the demonstration lenses 2' are removed, and the spectacle lenses 2 are set on the lens supporting base plates 36 and 37.

The procedure of the setting of the spectacle lenses 2 on the lens supporting base plates 36 and 37 is the same as the procedure in the case of the demonstration lenses 2', and detailed description is not given here.

When the setting of the spectacle lenses 2 has been completed, a drill starting button on the operation panel 75 is pressed.

Based on the position data of the drilling hole instructed by teaching and on the distance data in an X-axis direction between the drilling hole and the edge, the control device 78 issues drilling instruction signals to the X-axis motor drive unit 81, the Y-axis motor drive unit 83, the Z-axis motor drive unit 85, and the θ-axis motor drive unit 87. The control device 78 issues the drilling instruction signals, and based on the stored data, position setting of the drill 72 in a Y-axis direction is performed. By a procedure reverse to the procedure instructed by the teaching, the position of the drilling hole is automatically determined from the edge of the lens, and the drilling of the hole is carried out.

As described above, in the case each of the left and the right spectacle lenses 2 and 2 is tilted at a predetermined angle with respect to the reference line 58, the lens supporting base plates 36 and 37 are rotated symmetrically to each other and the tilt angle can be confirmed on the tilting index. As a result, it is possible to tilt the left and the right spectacle lenses 2 and 2 at the predetermined angle evenly and in reliable manner without causing variation.

The teaching operation for the drilling of the holes can be performed in simple manner by using the demonstration lens 2'. No technical skill is required on the operator, and the highly accurate drilling can be carried out.

It may be designed in such a manner that the lens supporting base plates 36 and 37 are not directly engaged with each other, but that each of the lens supporting base plates 36 and 37 is engaged with an angle adjusting gear. The angle adjusting gears may be engaged with each other, and one of the angle adjusting gears may be rotated. Or, the lens supporting base plates 36 and 37 may be linked with each other by a link mechanism so that the lens supporting base plates 36 and 37 are rotated symmetrically. The left and right lens supporting base plates 36 and 37 each comprise gear teeth 66 and said gear teeth 66 are intermeshed such that when said left and right lens supporting base plates 36 and 37 are rotated clockwise or counterclockwise, the other of said left and right lens supporting base plates 36 and 37 rotates symmetrically in an opposite direction. Further, the angle finding hole 41 may be provided on the lens supporting base plate 36 and another angle index 67 may be marked, and angle setting may be performed on the lens supporting base plates 36 and 37 individually and independently.

In the embodiment as described above, the lens holding unit 28 is fixed and the drill drive unit 29 is moved in X-axis and Y-axis directions, while it may be so designed that the drill drive unit 29 is fixed, and the lens holding unit 28 is moved in X-axis and Y-axis directions.

Also, the peripheral edges of the lens supporting base plates 36 and 37 may be designed in circular arc respectively with the rotation shaft as the center, and the angle index 67 may be marked on the peripheral edges of the lens supporting base plates.

Further, electric motors may be provided on the rotation shafts 38 and 39 respectively, and an angle detector, e.g. an encoder, for detecting rotation angles of the rotation shafts 38 and 39 may be mounted so that the rotation shafts 38 and 39, i.e. the lens supporting base plates 36 and 37, can be automatically rotated and the rotation angles can be detected. The tilt angles of the lens supporting base plates 36 and 37 when the angles are adjusted at the time of teaching may be stored in the storage unit 93 as angle data so that the tilt angles of the spectacle lenses 2 and 2 can be automatically set when holes are drilled.

What is claimed is:

1. A machine for spectacle lens, comprising a lens holding unit for holding left and right spectacle lenses, and a drill drive unit relatively moving in left and right directions and in front and rear directions with respect to said lens holding unit and for forming a hole on the spectacle lens held on said lens holding unit, wherein said lens holding unit has lens supporting base plates separated at left and right to match the left and the right spectacle lenses, the spectacle lenses at left and right are supported by said lens holding unit via said lens supporting base plates, and said left and right lens supporting base plates each comprise gear teeth and said gear teeth are intermeshed such that when said left and right lens supporting base plates are rotated clockwise or counterclockwise, the other of said left and right lens supporting base plates rotates symmetrically in an opposite direction with respect to the front-to-rear direction.

2. A machine for spectacle lens according to claim 1, wherein first positioning pins are erected at positions symmetrical with respect to the front-to-rear direction respectively on said left and the right lens supporting base plates, a horizontal reference plate is provided to stretch between said first positioning pins at left and right, said horizontal reference plate has a reference line extending in the left-to-right direction, and the reference line can be visually confirmed through the spectacle lens.

3. A machine for spectacle lens according to claim 1, wherein a rotation index is provided to indicate a rotation angle of said lens supporting base plate.

4. A machine for spectacle lens according to claim 1, wherein each of said lens supporting base plates comprises a second positioning pin erected so as to be positioned on the outside of said first positioning pin, a lens fixing arm provided so as to be capable of moving closer to and apart from said second positioning pin, a movable pin mounted on the tip of said lens fixing arm, and clamp flanges formed at the same heights on upper ends of said first positioning pin, said second positioning pin and said movable pin, wherein the spectacle lens is held by pressing said clamp flange of said movable pin to the spectacle lens under the condition that the spectacle lens is abutted to said clamp flange of said second positioning pin.

* * * * *